Nov. 20, 1956  L. M. BOHO  2,771,263
MOVABLE BRACKET FOR CAN OPENERS AND THE LIKE
Filed May 2, 1952  2 Sheets-Sheet 1
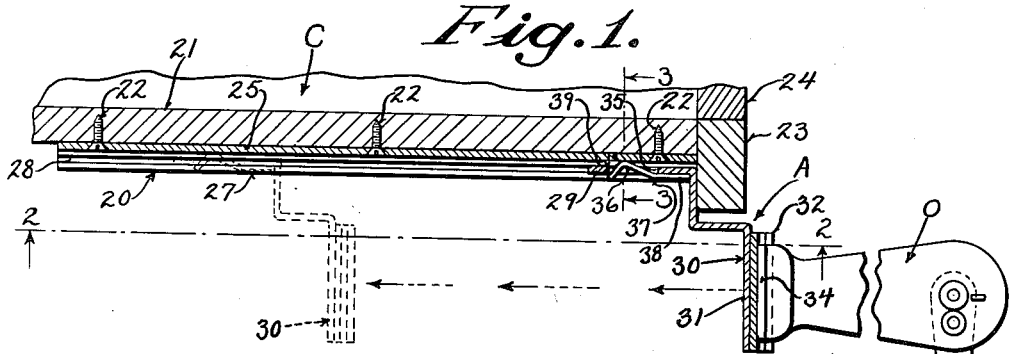
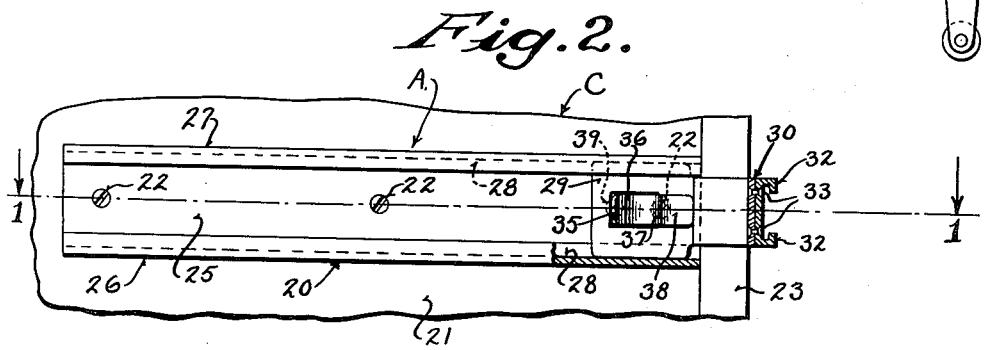
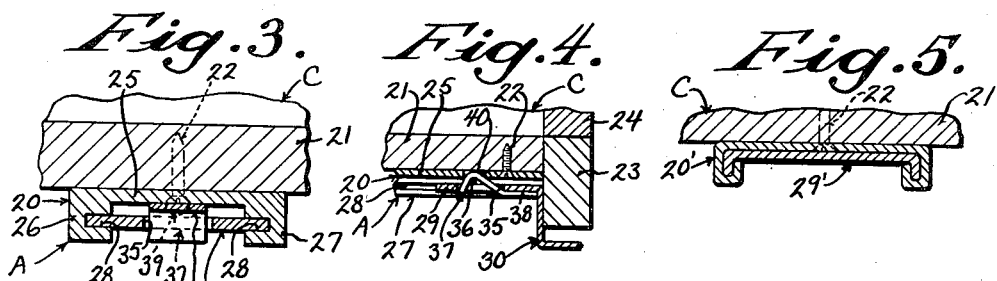
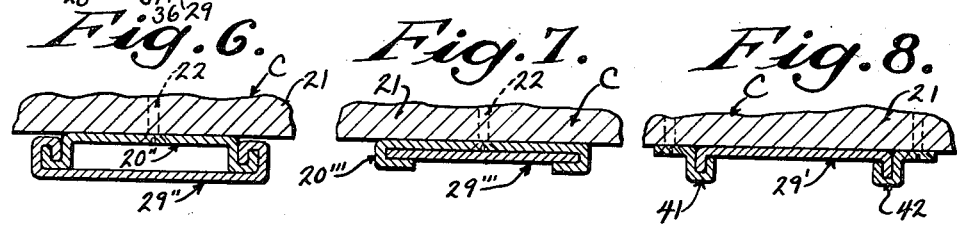
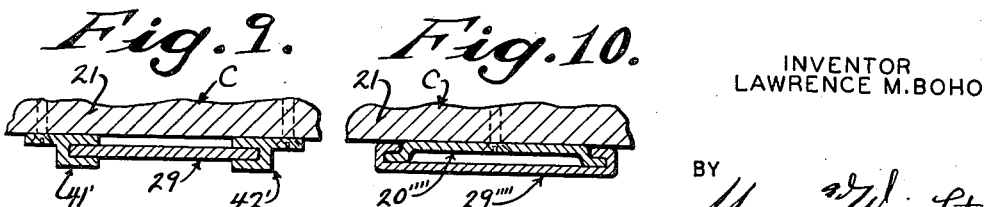
INVENTOR
LAWRENCE M. BOHO
BY
*Morning Wright*
ATTORNEYS Nov. 20, 1956   L. M. BOHO   2,771,263
MOVABLE BRACKET FOR CAN OPENERS AND THE LIKE
Filed May 2, 1952   2 Sheets-Sheet 2
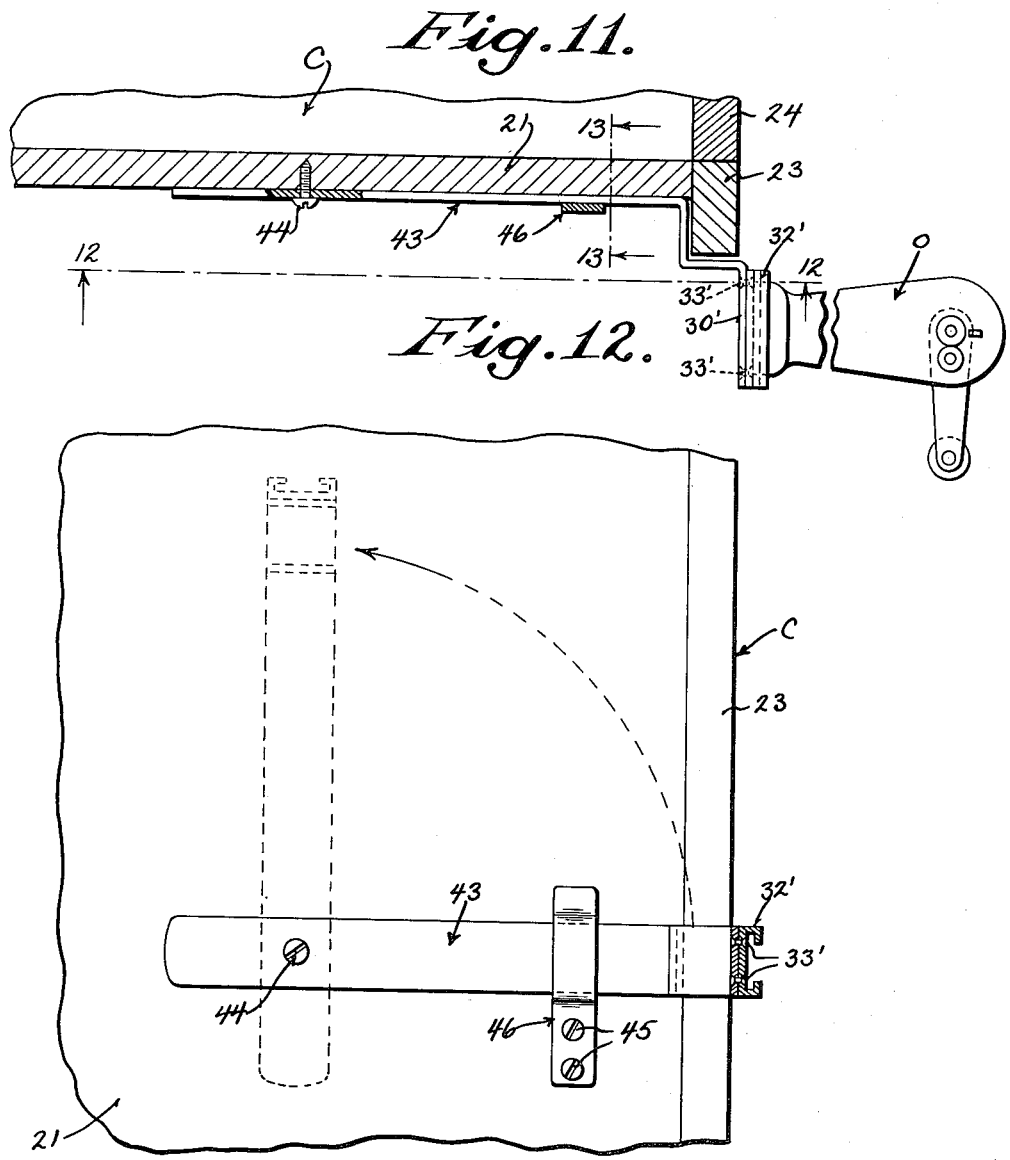
INVENTOR
LAWRENCE M. BOHO
BY
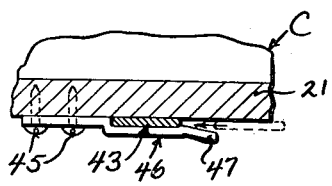
ATTORNEYS

United States Patent Office 2,771,263
Patented Nov. 20, 1956

2,771,263

MOVABLE BRACKET FOR CAN OPENERS AND THE LIKE

Lawrence M. Boho, Chicago, Ill.

Application May 2, 1952, Serial No. 285,660

1 Claim. (Cl. 248—298)

This invention appertains to movable brackets and more particularly to movable brackets for kitchen articles such as can openers and the like which may be moved from an operative to an inoperative position.

One of the primary objects of my invention is to provide a new and novel bracket which will effectively receive and support one end of kitchen articles such as can openers, ice crushers, knife sharpeners and other tools in an operative exposed position but which may be moved to an inoperative hidden position.

Another object of my invention is to provide a movable bracket for kitchen articles and the like which may be readily attached to the under surface of kitchen cabinets, shelves, etc.; one end of which is provided with a socket for receiving a mated end of the kitchen article to be supported.

A more specific object in one form of my invention is to provide a track secured to the under surface of kitchen cabinets, shelves, etc. which track carries a slide bracket or arm for supporting the kitchen tool and which has means for resiliently holding the bracket in its operative and inoperative positions.

Still another object of my invention is to construct my bracket (carrying a kitchen tool) in the form of a pivoted arm which may be swung to an inoperative hidden position and which may be swung and effectively supported in its operative extended position.

A still further object of my invention is to provide a movable bracket which is simple in construction, reliable in its operation and not liable to get out of order.

With these and other objects in view and to the end of attaining any other advantages hereinafter appearing, this invention consists in certain features of construction and combination of parts hereinafter described, pointed out in the claim and illustrated in the accompanying drawings.

In which drawings:

Figure 1 is a vertical sectional side elevational view of one form of my novel bracket shown attached to the under surface of a kitchen cabinet, the section being taken on the line 1—1 of Figure 2, looking in the direction of the arrows and illustrating in dotted lines the retracted position of my slide bracket;

Figure 2 is a bottom plan view in section taken on the line 2—2 of Figure 1 and looking in the direction of the arrows;

Figure 3 is a fragmentary transverse enlarged sectional view of my novel bracket taken on the line 3—3 of Figure 1 and looking in the direction of the arrows;

Figure 4 is a fragmentary sectional side elevational view of my bracket similar to Figure 1 of the drawings but illustrating a modified means for resiliently holding the bracket arm in its operative position;

Figures 5, 6, 7, 8, 9, and 10 are fragmentary enlarged transverse sections similar to Figure 3 of the drawings but illustrating modification in the track and sliding arm;

Figure 11 is a fragmentary side elevational view similar to Figure 1 of the drawings but illustrating a modified form of my bracket for supporting the kitchen articles;

Figure 12 is a bottom plan view in section of the novel bracket illustrated in Figure 11, the section being taken on the line 12—12 looking in the direction of the arrows and illustrating in dotted lines its inoperative hidden position beneath the cabinet; and Figure 13 is a fragmentary transverse section through the bracket illustrated in Figure 11, the section being taken on the line 13—13 and looking in the direction of the arrows.

Referring now to the drawings in detail, wherein similar reference characters designate corresponding parts throughout the several views, the letter "A" generally indicates one type of my improved bracket and the same is shown secured to the under surface of a kitchen cabinet "C" and supporting a can opener "O."

In the form of the invention illustrated in Figures 1 to 3 inclusive, I provide an elongated track section 20 which is secured to the under surface 21 of the kitchen cabinet "C" by means of screws 22. It is noted that the kitchen cabinet "C" is of a conventional construction and may or may not be provided with a front facing 23 and a door or closure 24 and it is to be understood that the track 20 may be secured to any surface such as the bottom of shelves, work tables, etc.

While it is obvious that the track 20 may be constructed of any desired material such as wood, hard plastic, etc., in the preferred embodiment I utilize a length of metal which includes the top portion 25 and a pair of thickened depending arms 26 and 27. The arms 27 are each provided with opposed longitudinally extending grooves 28. Slidable in the groove 28 is the upper plate portion 29 of the sliding bracket 30. The top portion 29 extends into and slides in the grooves 28. Extending downwardly from the forward end of the top plate 29 is the supporting arm 31 and this supporting arm 31 carries a socket 32 which is secured by means of rivets 33 or screws. This socket 32 is adapted to carry a can opener "O" as shown and, of course, it is obvious that the same may readily support any of a number of articles which are provided with the mating end 34 to be received in the socket 32. Such articles may include ice crushers, knife sharpeners or any of a number of such devices for kitchen use or other articles for other uses.

The sliding plate 29 of the bracket 30 is provided with a central rectangular opening 35 through which extends the upper end 36 of a spring finger 37. The spring finger may be welded or otherwise secured at 38 to the under portion of the plate 29. The upper end 36 of the spring finger is continuously urged against the top 25 of the track 20 and tends to stabilize and hold the supporting bracket 30 in any desired position. I may, in addition, provide a small button 39 which is secured to the under surface of the top portion 29 of the track 20 and over which the spring finger rides in its movement toward its operative position. In this manner, the slide bracket 30 will be firmly held in its operative position and the button 39 will resist movement of the bracket rearwardly toward its inoperative dotted line position. However, it is obvious that a pressure on the slide bracket 30 will overcome the resistance of the spring finger 37 and my bracket may be easily slid from its full line operative position to its inoperative position illustrated by the dotted lines. It is also apparent that the can opener "O" may be removed from the bracket and the bracket moved to its inoperative position or the whole assembly including the opener "O" may be pushed rearwardly.

In lieu of the lock button 39, I may provide the top surface 25 of the track 20 with a rectangular opening 40 into which the upper end 36 of the spring finger 37 will extend when the arm or slide bracket 30 is in its operative extended position and the opening 35 is aligned with the opening 40 as illustrated in Figure 4 of the drawings.

While in the preferred embodiment the track 20 is formed from a length of metal as above described, it is obvious that the same may be formed from an elongated thin strip of metal and bent in any of a number of sizes and configurations. The same is true of the plate 29 of the sliding arm or bracket 30.

In Figures 5, 6, 7, and 10 I have illustrated a number of these forms and it should be noted that in each form the configuration of the track and slide plate may be reversed from that illustrated. Of course, the track 20 may also be formed by providing two parallel extending lengths in lieu of the single bent strip. I have illustrated two possible forms of this arrangement in Figures 8 and 9 of the drawings wherein the track includes two parallel extending identically formed members 41, 42 and 41' and 42' respectively. The plate 29 is the same in Figure 9 of the drawings as that illustrated in Figures 1 to 3 inclusive and the plate 29' is identical to the plate 29' of Figure 5 of the drawings.

Referring now more particularly to Figures 11 and 13 inclusive, I illustrate a further modification of my novel bracket in which the same includes an elongated arm 43 which is pivoted adjacent its inner end by means of a screw 44 secured to the under side of the cabinet "C." The forward portion 30' of the arm 43 is identical in size and shape to that illustrated in Figure 1 of the drawings being provided with the operative portion to form the facing 23. This bracket also carries a socket member 32' which is secured to the portion 30' by means of the rivets or screws 33' and the same is adapted to carry the kitchen article or tool as illustrated (in the instance as the can opener "O"). In this embodiment of the invention, I firmly secure to the under side of the bottom 21 of the cabinet "C," by means of a pair of screws 45, a bracket 46. The bracket 46 receives and effectively supports the arm 43 when the same is in its operative extended position as illustrated in the full lines and the end 47 of the bracket 46 provides an open throat to receive the pivoted arm as it is moved to its operative position as illustrated by the arrow in Figure 13. When it is desired to move the arm to its dotted line, out of the way, position the same is merely grasped in the hand and moved in the direction of the arrows of Figure 12 of the drawings. It is obvious that the can opener "O" may be moved with the arm or the same may be removed therefrom.

While in the drawings I have shown a track and a slide plate, it is to be understood that where heavy articles are to be supported that double tracks and double slide plates can be utilized. This is particularly important where sliding shelves are employed for receiving canned goods or other articles. By employing elongated sliding shelves, the same can be pulled out from a cabinet or from under a table to permit the easy selection of articles from the rear of the shelf without disturbing other articles on the shelf or other articles in the cabinet.

From the foregoing it is believed that the features and advantages of my invention will be readily apparent to those skilled in the art, and it will, of course, be understood that changes in the form, proportions and minor details of construction may be resorted to without departing from the spirit of the invention or the scope of the appended claim.

I claim:

A support for kitchen and other articles adapted to be secured beneath kitchen cabinets and the like including an elongated track secured to the under portion of the cabinet transversely thereof and having its outer end facing the front of the cabinet, said track being closed at one end only, a bracket slidable in a horizontal plane in said track, the under surface of said track having a slot formed therein adjacent said outer end, a spring finger carried by the bracket and adapted to move into said slot to stop the forward movement of said bracket, said finger including means to retract the same and free the bracket for movement and removal from said track, and a socket disposed in a vertical plane secured to and depending from the outer end of said bracket for receiving the mated end of a kitchen or other article, whereby the bracket and the article may be slid in a horizontal plane to an inoperative position beneath the cabinet and to an operative extended position forward of the cabinet with the vertically disposed socket exposed to view.

References Cited in the file of this patent

UNITED STATES PATENTS

| | | |
|---|---|---|
| 441,187 | Muessel | Nov. 25, 1890 |
| 473,781 | Reed et al. | Apr. 26, 1892 |
| 1,055,201 | Mason | Mar. 4, 1913 |
| 1,361,625 | Schoenfeld | Dec. 7, 1920 |
| 1,602,261 | Hill | Oct. 5, 1926 |
| 2,173,159 | Ewan | Sept. 19, 1939 |
| 2,415,604 | Nalley | Feb. 11, 1947 |
| 2,463,110 | Johnson | Mar. 1, 1949 |
| 2,510,357 | Wilson | June 6, 1950 |

FOREIGN PATENTS

| | | |
|---|---|---|
| 662,984 | Great Britain | Dec. 12, 1951 |